United States Patent [19]

Kazarian, Jr.

[11] 4,310,064
[45] Jan. 12, 1982

[54] MULTI-PURPOSE AUTOMOBILE BRAKE ANTI-CREEP DEVICE

[76] Inventor: Adam Kazarian, Jr., 2155 Logan Dr., Sterling Heights, Mich. 48077

[21] Appl. No.: 8,524

[22] Filed: Feb. 1, 1979

[51] Int. Cl.$^3$ ............................................. B60R 27/00
[52] U.S. Cl. .................................... 180/271; 74/478.5; 74/539; 180/315; 188/265; 192/3 TR
[58] Field of Search ............... 180/273, 77 R, 77 AD, 180/271; 192/3 TR; 188/265; 74/539, 478, 478.5, 471 R, 482, 512, 513; 307/10 R, 10 SB, 10 LS

[56] References Cited

U.S. PATENT DOCUMENTS

| 1,927,209 | 9/1933 | Gilmore | 192/3 TR |
| 1,985,319 | 12/1934 | Gilmore | 192/3 TR |
| 2,708,005 | 5/1955 | Gazzo | 180/273 |
| 2,928,488 | 3/1960 | Stephen | 180/273 |
| 4,093,050 | 6/1978 | Mizuno | 192/3 TR |

FOREIGN PATENT DOCUMENTS

| 776923 | 1/1968 | Canada | 192/3 TR |
| 1201196 | 9/1965 | Fed. Rep. of Germany | 192/3 TR |

Primary Examiner—Joseph F. Peters, Jr.
Assistant Examiner—Donald W. Underwood

[57] ABSTRACT

An automatic-transmission wheeled motor vehicle having a wheel service brake applied by a brake pedal and an engine speed control operated by an accelerator pedal, the pedals being pivotally mounted side-by-side as to be operable by the vehicle operator's feet, is provided with a service brake anti-creep (original equipment or retrofit) device extending from the vehicle fire wall toward the pedals, the device including a stationary member having a slot and a spring latch with a rear lock edge and a front cam edge normally resiliently positioned in the slot, the brake pedal having a member extending toward the device and adapted, on final braking travel of the brake pedal, to cam the latch out of the slot and enter the slot to a position behind the lock edge so that the latch can re-enter the slot and retain the brake pedal member therein in the brake-on position, the device having structure adapted, upon initial operation thereof for increasing engine speed from idle, to pivot the latch away from the slot and the member so as to release the brake, the member having structure to render the anti-creep device inoperative if desired. The device, which is adaptable to an electro-mechanical configuration, further includes structure cooperating with the vehicle stop/turn signal electrical circuit to manually or automatically deactivate the exterior brake lamp circuit, as when the vehicle is shut down with the anti-creep brake on and servicing as the parking brake, and to reactivate the brake light circuit when vehicle is subsequently operated.

9 Claims, 11 Drawing Figures

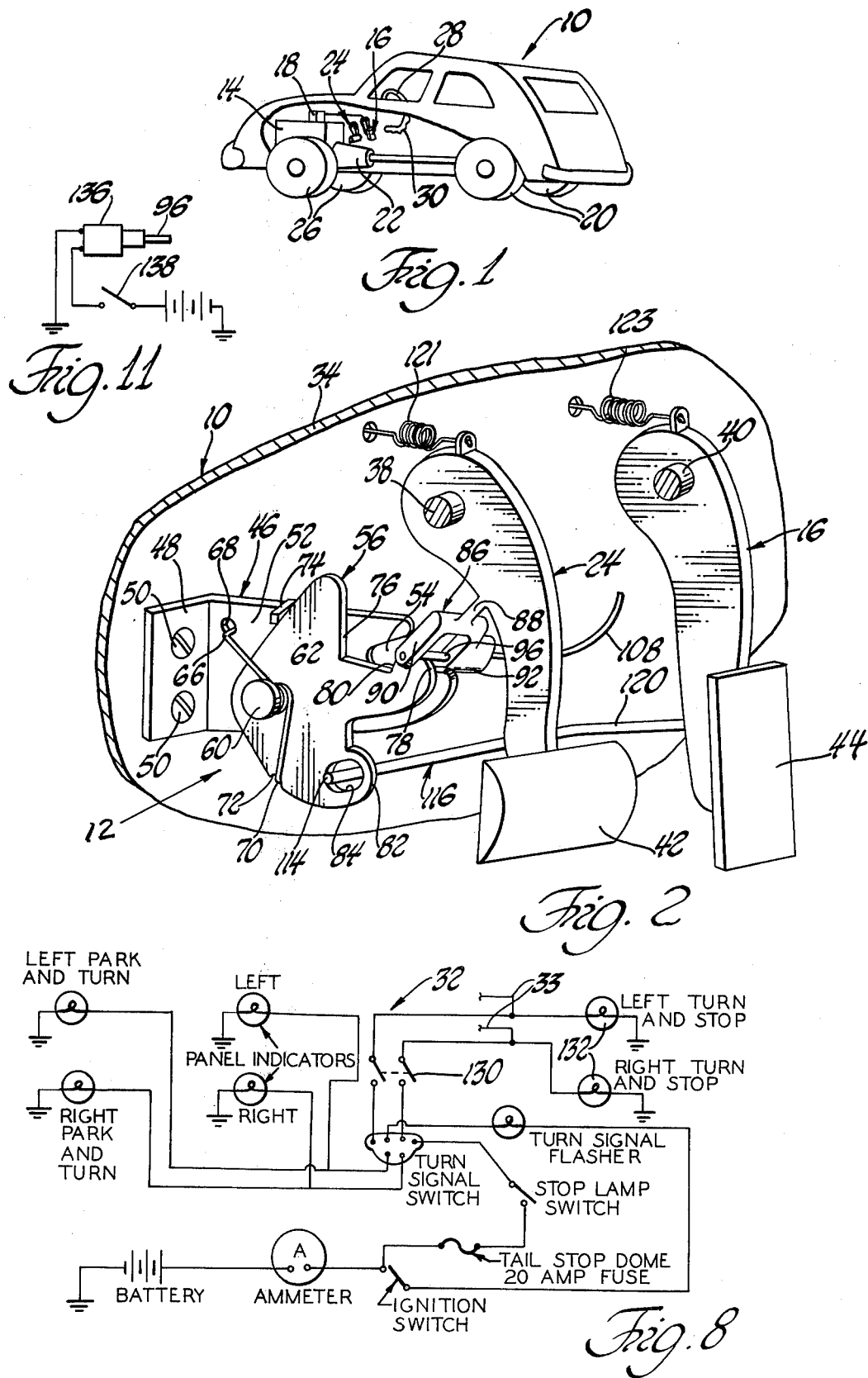

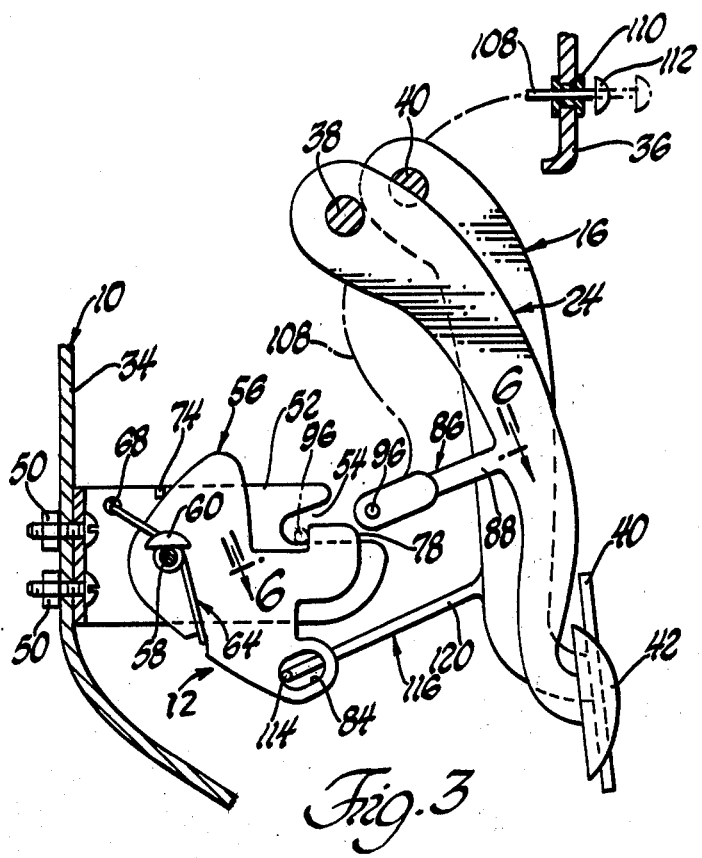
Fig. 3
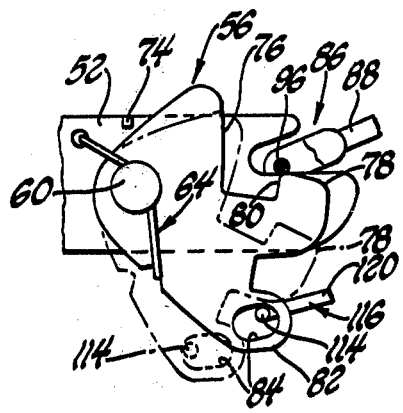
Fig. 4 (partial)
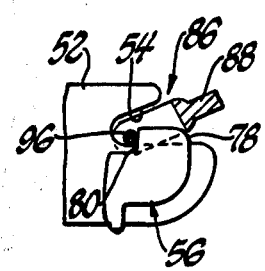
Fig. 5
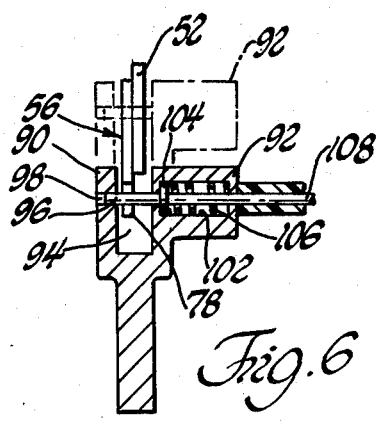
Fig. 6
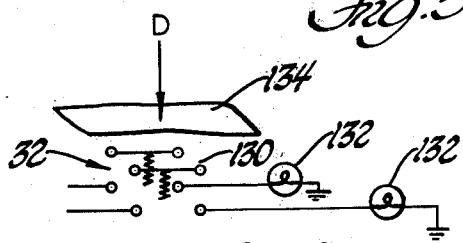
Fig. 9
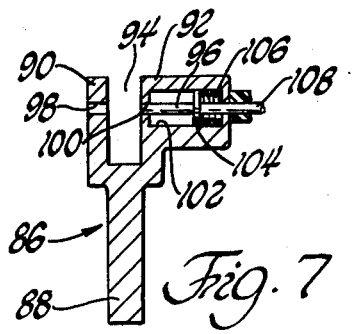
Fig. 7
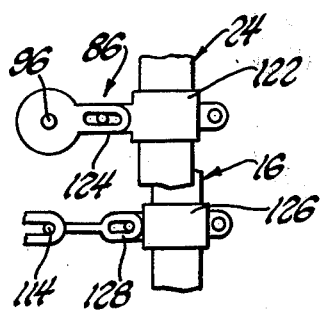
Fig. 10

MULTI-PURPOSE AUTOMOBILE BRAKE ANTI-CREEP DEVICE

BACKGROUND OF THE INVENTION

This invention relates generally to automatic-transmission automobiles, and more particularly to an anti-creep device therefor.

State and Federal laws (Motor Vehicle Safety Standard No. 105, for example) require that passenger automobiles be equipped with brakes such as a hydraulic service brake system, including an emergency brake system with a red failure warning light, and a friction-type mechanical parking brake system. Many state laws also specify use of such brakes, such as requiring use of parking brakes on hills, etc.

As is well known, when an automatic transmission passenger car, for example, is braked to a stop, as at a stop sign or traffic light, and the operator's feet are removed from the brake and accelerator pedals, the vehicle tends to creep forward, which is an annoying occurrence, if not actually a dangerous one.

By a private poll of one hundred (100) automobile owners, it was determined that 95% of such owners have automatic transmission vehicles and that 85% of them do not use the parking brake. One reason for not using the mechanical parking brake in northern climates may be that they tend to freeze up in the wintertime. This sometimes happens to the extent and at a time that the brake may, in fact, have to be damaged or ruined to free the vehicle. Once that is done, it is unlikely that the brake will be repaired, unless the state has an annual safety check, for example. Another reason that parking brakes are not used may be to eliminate the possibility of subsequently driving the vehicle with the parking brake on, despite the fact that a brake warning light is provided to indicate that condition.

It should be noted that the parking brake is applied only to the rear wheel brakes, if they are, in fact, used, and if they have not been ruined or worn out, as referred to above. Also, the "park" position of the transmission select lever, locks the transmission, not the brakes, and it may be, at least at times, not used when it should have been. The emergency service brake is required to apply only a portion of the service brake system.

A main object of this invention is to provide means in an automatic transmission motor vehicle to prevent forward creep of the vehicle when it is brought to a stop, as at an intersection, or in a traffic jam, with the motor running and the operator's feet are removed from the brake and accelerator pedals.

Another object of the invention is to provide such a device that locks the service brakes in the braking position in the above circumstances.

Another object of the invention is to provide such a device that will retain the service brake in the braking position even if the engine is turned off.

Still another object of the invention is to provide such a device that is automatically released when the accelerator pedal is depressed, as where it is desired to drive the vehicle when a traffic light turns to green, for example.

A further object of the invention is to provide such a device wherein the service brake lock is operative only in the last portion of service brake travel, just before the brake pedal is floored, for example, and wherein the locked service brake is released upon initial movement of the accelerator pedal from its free or engine idle position when the operator's foot is off the pedal.

Another object of the invention is to provide a means to retain the service brake in the brake-on position whenever the brake pedal is depressed to an essentially "floored" or full-on position, as where the vehicle is stopped on a hill.

Another object of the invention is to provide such a device or system having means to deactivate the exterior brake lights when leaving the vehicle with the service brake applied and to reactivate the brake light system upon reentering the vehicle, or to accomplish the same automatically.

A still further object of the invention is to provide such a device that can be manually deactivated, until manually activated, so that the vehicle can be used without the device when so desired.

A further object of the invention is to provide such an anti-creep system or device that is simple and inexpensive to manufacture and install, either at the factory for new vehicles, or as a do-it-yourself project for used vehicles.

These and other objects and advantages of the invention will become more apparent by reference to the following specification and the attached drawings.

BRIEF DESCRIPTION OF THE SEVERAL VIEWS OF THE DRAWINGS

FIG. 1 is a perspective view of a passenger vehicle to which the invention is applicable.

FIG. 2 is an enlarged perspective view of the floor of the automatic-transmission vehicle of FIG. 1, illustrating the service brake and accelerator pedals and a service brake anti-creep device embodying the invention.

FIG. 3 is an enlarged side elevational view of the structure of FIG. 2, taken in the direction of the arrow of FIG. 2.

FIGS. 4 and 5 are fragmentary portions of FIG. 3, illustrating various operational modes thereof.

FIG. 6 is a cross-sectional view, taken on the plane of line 6—6 of FIG. 3, looking in the direction of the arrows.

FIG. 7 is a view similar to FIG. 6, illustrating a different functional mode thereof.

FIG. 8 is a typical turn/stop lamp electrical circuit having features adapting the same to embody the invention.

FIG. 9 is a portion of FIG. 8 illustrating another embodiment thereof.

FIG. 10 illustrates a fragmentary portion of FIG. 3, to illustrate a modification of the invention.

FIG. 11 illustrates another modification.

DETAILED DESCRIPTION

Detailed reference is now made to the drawings, which are provided for purposes of illustration only, and wherein like structures are identified by like reference numerals.

FIGS. 1-3 illustrate a vehicle 10 having an anti-creep device 12 embodying the invention.

It is well known that the passenger motor vehicle 10, for example, includes an engine 14, means including an accelerator pedal 16 connected to a carburetor or other device 18 supplying motive fluid to the engine to control engine speed, drive wheels 20 and automatic transmission means 22 connected to the engine to drive the wheels, service brakes (including an emergency system)

for the wheels 20 and 26 controlled by a brake pedal 24, a steering wheel 28, a driver's seat 30 and a turn/stop lamp electrical circuit 32.

The general operation of such vehicle structures is also well known and will be described further only to the extent necessary to describe the device 12. That is, all such structure not shown in detail in the drawings is represented by the passenger vehicle 10 shown by FIG. 1, and thus considered as shown to the extent required to disclose and claim the invention specifically disclosed herein.

Referring now specifically to FIGS. 2 and 3, the vehicle 10 includes a fire wall 34 that separates the engine compartment from the passenger compartment, and the instrument panel 36 is spaced from the fire wall.

The brake pedal 24 is pivotally mounted under the panel 36 at its upper end, as at pivot 38, and an accelerator pedal 16 is similarly pivotally mounted on pivot 40, beside the brake pedal. The brake and accelerator pedals have the usual foot pads, 42 and 44, respectively. Except for the desired side-by-side pivotal mounting, the pedals may be of any desired structure.

That is, the specific structures of the brake and accelerator pedals may vary from vehicle to vehicle, and they are not critical to the structure and operation of the invention, which may include adjustment means to adapt the same for retrofit application thereof to in-use vehicles of different specific configuration in that respect.

The anti-creep device 12 preferably comprises a bracket 46 having a transverse end portion 48 adapted to be secured to the fire wall 34, as by screws or bolts 50 in the case of retrofit applications. In the case of original equipment installation, the bracket 46 may be welded to the fire wall, for example.

Whatever the means of attachment, the bracket 46 includes a portion 52 extending outwardly from the fire wall toward the brake pedal 24, but spaced therefrom so that the brake pedal can be depressed, in the normal use thereof, almost (but not quite) to its full brake-on or floored position without locking the brake.

The brake lock function will be described, it being important to note that the brake pedal 24 can be depressed and released, at will, as usual, so long as the brake pedal is not floored, at which time the anti-creep brake lock is activated. In the latter event, the accelerator pedal 16 must be depressed slightly to release the brake, as will be explained. That is, the locked brake pedal 24 will be released, as it should be, when the accelerator pedal 16 is depressed to drive the vehicle in either direction.

As shown in FIGS. 2–5, the portion 52 of bracket 46 is formed at the free end thereof with a generally open-end V-shaped slot 54. A latch member 56 is pivotally secured to portion 52, as on a pivot pin 58 fixedly secured to bracket portion 52 and having a head 60 thereon to act as a retainer for the loops 62 of a torsion spring 64.

One end 66 of the spring 64 is secured in the opening 68 therefor in portion 52, and the other end 70 thereof is engaged in the slot 72 formed in latch member 56. The force of spring 64 is such that the latch 56 is normally retained in the solid line positions of FIGS. 2, 3 and 5 with respect to the portion 52 of bracket 46, as will be described. Stop tab 74 is provided on portion 52, to limit the counterclockwise rotation of latch 56 on pin 58 by spring 64.

The latch member 56 has a generally cut-out portion 76, to allow entry to the V-slot, and to provide a cam edge 78 and a lock edge 80, which will be described. Latch 56 is also formed with a lower portion 82 having a closed-end slot 84 provided for a purpose to be described.

Referring now to FIGS. 2–7, the brake pedal 24 has extending therefrom a member 86 adapted to operate the latch 56, and to be engaged by the lock edge 80 of the latch. For this purpose, the member 86 is formed as a brake pedal projection 88 having a bifurcated free end, the legs 90 and 92 of which have a sufficient space 94 therebetween to freely receive the side-by-side portion 52 and latch 56, with substantial clearance, as shown in FIGS. 4–6, when the brake pedal 24 is depressed toward the fire wall to apply the service brake. A pin 96 normally extends across space 94 and into the openings 98 and 100 formed in the legs 90 and 92, respectively.

When pin 96 is in the operative position, across space 94, as shown in FIGS. 2–6, and brake pedal 24 is depressed, the pin 96 initially will engage the curved cam portion 78 of the latch and rotate the same clockwise and downwardly toward the solid line position of FIG. 4. As the brake pedal is moved to the substantially floored position, the pin 96 will continue to engage cam edge 78 and rotate the latch clockwise until the pin passes the lock edge 80, at which time the spring 64 will force the latch back to the solid line positions of FIGS. 3 and 5. In the solid line brake-locked position of FIG. 5, with the pin 96 behind the locking edge 80, the brake pedal 24 cannot return from its depressed (floored) position to its free position, and the hydraulic service brake is thus locked in the brake-on position.

As best seen in FIGS. 6 and 7, leg 92 of member 86 is formed with a cylinder 102 slidably receiving an annular spring seat flange 104 formed on pin 96, a helical coil compression spring 106 being disposed between the seat 104 and the outer end of the cylinder. The spring 106 thus urges the pin 96 to the operative position (FIG. 6) across the space 94. A flexible cable 108 suitably secured to pin 96 extends in any suitable manner, as through a grommet 110, to the dash or instrument panel 36, the cable having a manual control knob 112 at the end thereof.

In order for the anti-creep device 12 to be operative, the pin 96 must be in the FIG. 6 position to engage and depress the cam edge 78 and to become engaged by lock edge 80. If it is desired to render the device inoperative, the knob 112 can be pulled out so that the cable 108 will withdraw the pin 96 from space 94, as shown in FIG. 7. With the pin withdrawn, there is nothing to activate the latch 56, and the vehicle brake system will operate as if the device 12 were not included in the brake system. That is, the bracket portion 52 and latch member 56 will merely pass freely into and out of the space 94, as the brake pedal 24 is depressed and released. If it is desired to use the device 12, the knob 112 is pushed in to reinsert the pin 96 across space 94.

It will be noted, in FIGS. 2–4, that latch member 56 is formed with a lower portion 82 having a slot or opening 84, which receives the free end 114 of a rod 116. As best seen in FIG. 2, portion 118 of rod 116 extends from the free end thereof parallel to the fire wall 34 to its juncture with portion 120, which is secured to accelerator pedal 16 and extends toward the fire wall 34.

The specific detailed geometry, configuration, range of movement and dimensions of the elements of the total structure, such as the pedals 16 and 24, the portion 52 and latch member 56 of device 12, the opening 84, the member 86 and the rod 116 will vary with vehicle makes and models. However, they must be such that operation of the device 12 is accomplished, but that no such element in any way interferes with normal brake pedal or accelerator pedal operation. That is, FIGS. 2 and 3 illustrate the normal free (engine off or pedals 24 and 16 released) positions of these elements, and it must be possible to operate either the brake pedal or the accelerator pedal through its full range of operative movement. It is understood, of course, that each pedal is returned to its free position by a suitable spring element, such as springs 121 and 123 shown schematically.

For example, application of the brake pedal 24 must not drag or push the rod 116 to operate the accelerator pedal 16 and accelerate the engine 14. For this purpose, the opening or slot 84 may be an open slot, as suggested by the broken lines in FIG. 2. Also, the slot 84 may be of any desired shape to avoid interference. Actually, the only function of rod 116 is to rotate latch member 56 clockwise, against the force of spring 64 (to release the brake pedal 24 upon initial movement of the accelerator pedal 16), which may be accomplished by contact of rod end 114 with the left end of slot 84.

When the vehicle 10 is approaching a stop sign or light, or some situation where slowing down or stopping is required, the service brake pedal 24 is normally depressed an amount less than full application to the floored position. By this means, the vehicle can be, and normally is, progressively slowed down sufficiently so that the brake pedal 24 does not have to be floored to actually stop the vehicle. In bumper-to-bumper traffic, for example, the vehicle can be deliberately made to creep up by controlled partial application and releasing of the brake pedal. However, in parking, the brake pedal will normally be substantially floored to prevent damage to the vehicle, or to other vehicles at the ends of a curb parking space.

With the above described latch structure, anytime the brake pedal is floored, the service brake will be locked, and act as a parking brake. However, if the service brake is locked in the brake-on position in this manner, it can be released easily with the structure of the invention, reference being made to FIG. 5, wherein the floored and/or locked brake pedal position is shown, and to FIG. 4, wherein the pre-lock and pre-release modes are shown.

As referred to above, the accelerator pedal 16 is formed with a latch release bar or rod 116 extending toward the fire wall and having a lateral extension, the free end 114 of which is received in the opening or slot 84 in the latch member 56. The structure is such that the end 114 of the release rod 116 is (a) near the right-hand end of the slot (FIG. 4) when the brake pedal approaches the floored position, and (b) at the left-hand end of the slot (FIG. 3) when the latch 56 is rotated counterclockwise by spring 64 to lock the brake on.

With the end 114 of rod 116 near the left end of slot 84 when the brake is locked, it will be apparent that a very minimal movement of the accelerator pedal to accelerate the engine will rotate the latch 56 clockwise about pin 58. Since lock edge 80 is vertical, it lies essentially on an arc having the pin 58 at its center, so that such minimal movement of accelerator pedal 16 causes release of pin 96. Release of pin 96 allows the brake return spring 121 to return the brake pedal to the brake off position. The vehicle is then free to be accelerated if so desired.

The force of spring 64 is preferably sufficient only to rotate the latch 56 back to the solid line position of FIGS. 2, 3 and 5, its only function, and resistance thereof to throttle pedal operation should be minimal. That is, operation of the accelerator pedal 16 to increase engine speed rotates latch 56 clockwise, against the springs 123 and 64, the combined forces of which should not be excessive.

FIGS. 2 and 3 illustrate the pedals in their free position. FIG. 4 illustrates brake pedal member 86 in the position thereof just before the brake is either locked or released—that is, pin 96 is either about to be locked by or released from lock edge 80 shown in solid line position. FIG. 5 illustrates pin 96, and thus the brake, in the locked position, the locked pin 96 being also shown in broken lines in FIG. 3.

FIG. 4 also illustrates latch member 56 in broken lines, to which position it can be rotated by end 114 of rod 116 upon further acceleration of the engine, against the main force of return spring 123 and the preferably lesser force of latch spring 64. That is, rod end 114 possibly must be free to continue to move toward the fire wall 34 as accelerator pedal 16 is further depressed toward wide open throttle position. This may require continued clockwise rotation of latch member 56 about pin 58 against spring 64, depending upon the vehicle brake and accelerator pedal structure.

FIG. 10 is a reduced fragmentary portion of FIG. 3 illustrating the manner in which the device 12 can be adapted to in-use vehicles. Specifically, the application to in-use vehicles would probably involve attachment of a member 86 and a rod 116 to the pedals 24 and 16, respectively, for operation of the device 12. Also, adjustability may be required to adapt the device 12 to the various configurations of in-use vehicles.

For the above purposes, the device provides member 86 with a split collar attachment means 122 to pedal 24, with a well-known two-piece slot adjustment means 124 to adjust the position of pin 96 with respect to lock edge 80. Similarly, split collar attachment means 126 and two-piece slot attachment means 128 are provided on pedal 16 to adjust end 114 of rod 116 with respect to slot 84. Of course, such means are by way of example only, and other structure may be employed.

Whenever the vehicle brakes are applied, the vehicle brake lights go on, and this will be so when the service brake is locked in the brake-on mode by the anti-creep device 12. This is obviously undesirable when the vehicle is to be left in that condition, and manual or automatic means may be provided to deactivate (by cutting electrical power) the brake light circuit, and turn off the brake lamps, when the anti-creep device 12 has locked the service brake on, as when the vehicle is parked and the engine is shut down.

FIG. 8 illustrates a typical stop/turn lamp circuit, as illustrated in an automative repair publication, all of the elements thereof being labelled and the operation thereof being apparent. Of interest to the invention is the manual switch 130 that may be opened to deactivate (cut off power to) the brake light circuit and lamps 132 for the purpose referred to above. Switch 130 could be incorporated in the ignition switch so that activation of the brake light circuit requires that the ignition be on. As shown in FIG. 9, the switch 130 can be a pressure switch in the driver's seat 132, so that the stop light circuit is deactivated and activated by the absence or presence of the driver. Of course, whether the switch 130 is part of the ignition switch or a seat pressure switch, the brake circuit is automatically deenergized when the vehicle is not being operated, even though the service brake is on by operation of device 12. If switch 130 is a separate manual switch, then it must be opened upon leaving the vehicle, and closed upon reentering the vehicle, if device 12 is used to lock the service brake for parking an unattended vehicle.

From the above description, it will be apparent that the invention fulfills the stated objects thereof.

While a particular mechanical configuration of the invention has been shown and described, certain changes may be made, and other modifications and configurations are possible, within the scope of the invention.

For example, instead of the purely mechanical configuration of the anti-creep device, the device 12 may include electro-mechanical features or elements. That is, it is possible that latch member 56, or the pin 96 (See FIG. 11), could be operated by electrical means, such as a solenoid 136. In that event, electrical power for operation may be controlled by a switch 138 appropriately closed and opened by the pedals 24 and 16, respectively, in a manner similar to that in which a brake pedal operates the usual stop light switch. That is, device 12 could be designed so that pin 96 is positioned in space 94 by the solenoid 136 when energized by closing of switch 138 whenever brake pedal 24 reaches the floored position, and so that pin 96 is withdrawn from space 94 (by the usual solenoid spring—not shown) upon deenergization of the solenoid by opening of switch 138 when the accelerator pedal 16 is initially depressed from its free (engine idle) position.

Instead of operating pin 96, a similar electro-mechanical system could be employed to pivot, and thus lock and release, latch 56, from pin 96.

In either its mechanical or electro-mechanical form, the invention provides an automatic transmission vehicle having a service brake that is adapted to be locked in the brake-on position upon full application of the brake so as to act as an anti-creep device or as a parking brake, and to be released upon initial actuation of the accelerator pedal.

While the stop lamps (132 of FIG. 8) are normally disposed at the rear of the vehicle, circuit 32 could be modified to include lamps 132 at the front of the vehicle, as represented by branch conduits 33, for purposes of use of the locked service brakes as a parking brake.

Accordingly, no limitations are intended, except as recited in the appended claims.

What I claim as my invention is:

1. A motor vehicle, comprising the combination of steering and driving road wheels, an engine, a fire wall, an accelerator foot pedal pivotable toward said fire wall to increase the speed of said engine and returned to its free engine-idle position by a spring, a service brake for said vehicle, control means such as a brake foot pedal pivotable toward said fire wall to apply said service brake and returned to its free brake-off position by a spring, drive means between said engine and said driving wheels to propel said vehicle, said drive means including an automatic transmission engagable to and from a vehicle drive condition, said vehicle having the potential of creeping when said transmission is in drive while said engine is operating and said brake and accelerator pedals are in their free brake-off and engine-idle positions, as when the vehicle driver brings said vehicle to a stop at a traffic light and then removes his feet from said brake and accelerator pedals, and an anti-creep device to prevent said creep, said device comprising first latch means operative to lock said service brake in the brake-on condition only upon attainment of a predetermined position of said brake pedal in final movement thereof toward the full (floored) brake-on position, whereby the driver can alternately depress said brake pedal to any extent less than said predetermined position and release the same without locking said brake, and second means operative to unlock said service brake upon initial movement of said accelerator pedal from its free engine-idle position, whereby said service brake can be either left in the brake-on position or alternately locked in the brake-on position by operation of said brake pedal and automatically released by operation of said accelertor pedal without any action by the driver that would not be required in the absence of said device, bracket means extending toward said pedals from said fire wall and having said latch means mounted thereon, said latch means being pivotally mounted on said bracket and retained in a free brake-locking position by resilient means urging the same against a stop, said latch having a locking element formed thereon, a member extending from said brake pedal toward said bracket and having a portion adapted to rotate said latch to its brake release position, whereby when said portion passes by said locking element of said latch, the latter will be automatically returned to its brake-locking position by said resilient means, said member comprising an extension of said brake pedal so as to be pivotable therewith and being formed with a bifurcated free end providing spaced arms and a pin extending through said space between the free ends of said arms, said bracket being positioned to be aligned with said space and formed at the free end thereof adjacent said brake pedal with a slot formed and adapted to receive said pin, said latch having a cam edge thereon adapted to be engaged by said pin upon pivoting of said brake pedal toward braking position so as to pivot said latch to its brake release position, said cam edge joining and terminating at said locking element which comprises a cut out area of said latch providing an edge to retain said pin when said latch is returned to brake lock position by said resilient means.

2. A vehicle such as that recited in claim 1, wherein said braket and said latch comprise side-by-side plates and said resilient means comprises a torsion spring.

3. A vehicle such as that recited in claim 2, wherein said pin is formed so as to be capable of being manually withdrawn from said space between said arms, when desired and until manually returned, so as to deactivate said anti-creep device and allow vehicle operation free of said device.

4. A vehicle such as that recited in claim 3, wherein said vehicle has a dash panel and said pin has a control cable connected thereto and extending to the said vehicle dash panel for manual control of said pin.

5. A motor vehicle, comprising the combination of steering and driving road wheels, an engine, a fire wall, an accelerator foot pedal pivotable toward said fire wall to increase the speed of said engine and returned to its free engine-idle position by a spring, a service brake for said vehicle, control means such as a brake foot pedal pivotable toward said fire wall to apply said service brake and returned to its free brake-off position by a spring, drive means between said engine and said driving wheels to propel said vehicle, said drive means including an automatic transmission engagable to and from a vehicle drive condition, said vehicle having the potential of creeping when said transmission is in drive while said engine is operating and said brake and accelerator pedals are in their free brake-off and engine-idle positions, as when the vehicle driver brings said vehicle to a stop at a traffic light and then removes his feet from said brake and accelerator pedals, and an anti-creep device to prevent said creep, said device comprising first latch means operative to lock said service brake in the brake-on condition only upon attainment of a predetermined position of said brake pedal in final movement thereof toward the full (floored) brake-on position, whereby the driver can alternately depress said brake pedal to any extent less than said predetermined position and release the same without locking said brake, and second means operative to unlock said service brake upon initial movement of said accelerator pedal from its free engine-idle position, whereby said service brake can be either left in the brake-on position or alternately locked in the brake-on position by operation of said brake pedal and automatically released by operation of said accelerator pedal without any action by the driver that would not be required in the absence of said device, said vehicle further comprising a battery, an ignition switch and a brake electrical circuit powered by said battery and including at least one service brake lamp activated by a first brake pedal switch, said circuit further including a second switch adapted when opened to deactivate said circuit so that said lamp will not be lighted even though said service brake is locked in the brake-on position by said anti-creep device as a parking brake.

6. A vehicle as that recited in claim 5, wherein said second switch is a separate manual switch in said circuit or a switch incorporated in said ignition switch.

7. A vehicle such as that recited in claim 5, wherein said second switch is a pressure switch disposed in said driver's seat so as to be open to deactivate said circuit when there is no driver, as when the vehicle is left with said service brake locked in the brake-on position by said anti-creep device.

8. A motor vehicle, comprising the combination of steering and driving road wheels, an engine, a fire wall, an accelerator foot pedal pivotable toward said fire wall to increase the speed of said engine and returned to its free engine-idle position by a spring, a service brake for said vehicle, control means such as a brake foot pedal pivotable toward said fire wall to apply said service brake and returned to its free brake-off position by a spring, drive means between said engine and said driving wheels to propel said vehicle, said drive means including an automatic transmission engagable to and from a vehicle drive condition, said vehicle having the potential of creeping when said transmission is in drive while said engine is operating and said brake and accelerator pedals are in their free brake-off and engine-idle positions, as when the vehicle driver brings said vehicle to a stop at a traffic light and then removes his feet from said brake and accelerator pedals, and an anti-creep device to prevent said creep, said device comprising first latch means operative to lock said service brake in the brake-on condition only upon attainment of a predetermined position of said brake pedal in final movement thereof toward the full (floored) brake-on position, whereby the driver can alternately depress said brake pedal to any extent less than said predetermined position and release the same without locking said brake, and second means operative to unlock said service brake upon initial movement of said accelerator pedal from its free engine-idle position, whereby said service brake can be either left in the brake-on position or alternately locked in the brake-on position by operation of said brake pedal and automatically released by operation of said accelerator pedal without any action by the driver that would not be required in the absence of said device, said anti-creep device comprising electromechanical circuit means including an electromagnetic latch means, said electro-mechanical means comprises latch means including a solenoid-operated pin, said solenoid being energized and deenergized by a switch means.

9. In a motor vehicle having driving wheels, an engine, a passenger compartment including a driver's seat, a drive train between said engine and said wheels including an automatic transmission engagable to and from vehicle drive condition, a fire wall between said engine and said driver's seat, a service brake for said wheels, a brake foot pedal pivotable toward said fire wall for energizing said brake and returned to its free brake-off position by a spring, an accelerator foot pedal pivotable toward said fire wall for accelerating said engine and returned to its free engine idle position by a spring, and an electrical brake lamp circuit energized when said service brake is on, said vehicle having the potential of creeping when said transmission is in drive while said engine is operating and said brake and accelerator pedals are in their free positions, as when the drive brings said vehicle to a stop at a traffic light and removes his feet from said pedals, and a device to prevent said creep, said device comprising a bracket attached to said fire wall and extending toward said brake pedal, said bracket comprising a plate lying in a vertical plane and having the free end thereof formed with a first generally V-shaped slot and a latch plate secured on said bracket, said latch being pivotable on said bracket on a pin secured to said bracket, said pin having an enlarged head spaced therefrom to provide a retainer for the multiple loops of a torsion spring mounted on said pin, said spring having one end thereof secured to said bracket and the other end thereof secured to said latch, said spring urging said latch to its free brake-locked position against a stop on said bracket, said latch having a cam edge and a lock edge disposed at said V-slot in its free position, said brake pedal having an extension thereof with a bifurcated free end having spaced arms and a pin extending between said spaced arms at the free ends thereof, said pin being movable with said brake pedal so as to engage said cam edge and pivot said latch downwardly toward brake release position until said pin passes said lock edge, at which time said latch spring is operative to pivot said latch back to its brake lock position to prevent return of said brake pedal to its free brake-off position, said latch having a second slot therein, said accelerator pedal having a rod extending therefrom toward said fire wall and then laterally toward said latch, the free end of said rod extending into said second slot, said rod and second slot arrangement being such that initial movement of said accelerator pedal from its free engine-idle position to accelerate said engine pivots said latch to the brake-release position, said latch being pivotable beyond said brake-release position for full engine acceleration, said device being arranged so that said brake and accelerator pedals are each free to pivot through the full required operational range thereof without interference by said other pedal, said pin having a cable extending therefrom to said instrument panel so that said pin may be withdrawn from said space between said arms to render said device inoperative, and a switch to render said brake lamp circuit inoperative when said vehicle is left with said anti-creep device in the brake-on position.

* * * * *